Figure 1:
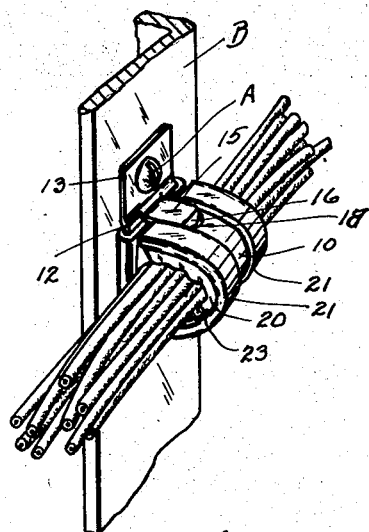

April 12, 1949.   G. A. TINNERMAN   2,466,921
SNAP CLAMP
Filed Jan. 8, 1945

INVENTOR.
GEORGE A. TINNERMAN
BY
Bates, Teare v McBean
ATTORNEYS

Patented Apr. 12, 1949

2,466,921

UNITED STATES PATENT OFFICE 2,466,921

SNAP CLAMP

George A. Tinnerman, Cleveland, Ohio, assignor to Tinnerman Products, Inc., Cleveland, Ohio, a corporation of Ohio Application January 8, 1945, Serial No. 571,785

3 Claims. (Cl. 248—74)

This invention relates to a clamp of a type adapted to surround an object, for instance, an assembly of wires, and be attached to a support, the clamp being placed about the object either before or after the attachment of the clamp. My clamp is preferably an approximately U-shaped member of spring material, one end portion of which is adapted to have a snap engagement with a portion near the other end, the extension of such other end beyond the engaging region being adapted for attachment to a support.

One of the objects of the invention is to provide such a clamp in an extremely simple form in which the free end may be readily snapped into engagement with the portion of the clamp adjacent the other end to lock the clamp and may be readily released from such locked condition by manual pressure on the free end.

Another object of the invention is to provide a clamp of the character described of a form adapted for readily carrying a yielding lining extending along the inner surface of the clamp and help in place by having portions overlapping onto the outer surface.

Still another object of the invention is to provide for the locking of the free end in a plurality of positions to allow for variation in the size of the object clamped.

My invention is well adapted for airplane work, enabling the immediate mounting of a clamp on a group of wires and the attachment of the clamp to a support, and after attachment enabling the immediate opening and subsequent closing of the clamp without disturbing the attachment. This provides also for a quick change of a damaged wire, which is especially valuable in airplane installations.

An approved embodiment of my invention is illustrated in the drawings hereof and is hereinafter more fully described.

Figure 2:
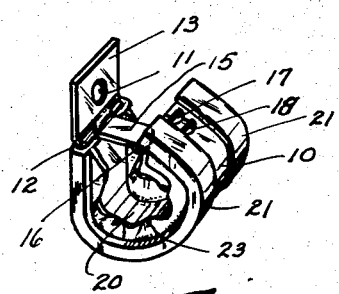
Figure 3:
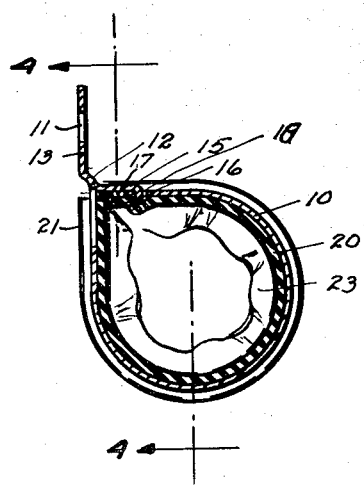
Figure 4:
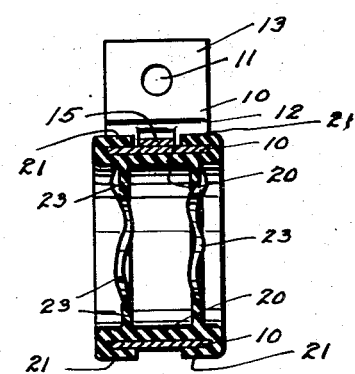

In the drawings, Fig. 1 is a perspective showing one of my clamps mounted on a support and embracing a bundle of wires; Fig. 2 is a view of the same clamp unattached and open to receive the object or objects to be clamped; Fig. 3 is a vertical section of the clamp of Figs. 1 and 2, in closed position; Fig. 4 is a cross section through the clamp as indicated for instance by the line 4—4 on Fig. 3.

As shown, the body of my clamp comprises a strap 10 of spring sheet metal, preferably straight in its lateral cross section, and looped into approximate U-shape. The body portion preferably carries a yielding lining 20 which assists in tightly holding the object clamped. The two end portions of the loop beyond the lining are specially formed to interlock with each other, and to provide for the attachment of the clamp to a support, as about to be explained.

The strap 10 is provided with an opening 11 by which the clamp may be secured in place, as for instance by a screw A passing into a support illustrated at B in Fig. 1. The portion of the clamp carrying the opening 11, designated 13, is preferably offset backwardly at 12 from the portion of the clamp below such extension, the amount of the offsetting being practically the same as the thickness of the flange 21 of the yielding liner 20 which extends behind the body. This enables the complete clamp with the liner to have a substantially flush back portion adapted to bear against a flat supporting surface.

Beneath the offset portion 13 of the body, and preferably adjacent the offsetting region, I provide a tongue 15 extending forwardly from the body. This tongue is partially severed from the body but attached thereto at the upper end of the tongue. The tongue is then bent forwardly at approximately right angles to the body and its lower end is then bent downwardly and curved backwardly to provide a hook 16.

The other end of the body is provided near its end with a transverse slot 17 adapted to be occupied by the hook to hold the clamp closed. In closing the clamp the extreme edge of the free end portion naturally engages the hook on the tongue and is cammed thereby slightly downwardly, so that the slot passes beneath the hook and then springs outwardly to receive the hook, thus locking the parts together, as shown in Figs. 1 and 3.

To provide a certain leeway in the extent of the area covered by the clamp, I prefer to make a plurality of transverse slots any of which may be engaged by the hook 16. The drawings show two of these slots, the additional slot 18 being parallel with the slot 17 already mentioned and allowing a tighter clamping of the device. Each of the slots is preferably straight on its outer edge and may readily be curved from end to end on the inner edge as shown.

The liner 20 referred to is preferably a removable strip of rubber or similar material having two edge flanges 21 which lie along the outer face of the clamp and hold the liner in place when the liner is mounted on the body. The liner preferably is formed with longitudinal ribs or other extensions on its inner surface indicated at 23, which being yielding provide for the clamping of various articles, for instance a bundle of insulated wires, without danger of injuring the same.

The tongue 15 is materially narrower than the width of the clamp and is preferably cut from a central transverse region of the clamp strip so that the material of the strip extends on each side of the tongue and effectively carries it. Similarly the slot or slots in the free end of the clamp are materially shorter than the width of the strip and are preferably centrally located, with the body of the strip extending equally across each of the slot or slots.

The provision for comparatively narrow tongue and slots enables the liner to be held in place by its edge flanges 21 overlapping onto the outer side of the clamp without interfering with the locking action of the tongue and the slot or slots.

The arrangement of the narrow tongue to lie between the two flanges of the liner provides for an especially compact smooth form of attachment of the body to the free end without external projections, the tongue lying between the flanges of the liner and having its outer surface projecting no farther than the outer surface of the liner. Accordingly, there is nothing on which one's garment or any other material might inadvertently catch. The construction enables the installation of the entire clamp within a very restricted space, which is sometimes desirable.

I claim:

1. A clamp comprising a loop of spring material, a tongue partially severed from the body of the loop and extending forwardly and formed at its end with a downturned hook projecting backwardly, the other end of the loop being adapted in closing the clamp to be cammed by the hook into position beneath the tongue, such free end of the loop being provided with a transverse slot adapted to be occupied by the hook.

2. A clamp comprising a loop of spring material, a comparatively narrow tongue carried by the rear portion of the loop and extending forwardly, the end of the tongue being formed into a downturned hook, the other end of the loop being provided with a transverse slot adapted to receive the hook when the clamp is closed, and a liner on the interior of the loop having edge flanges lapping over onto the exterior, the tongue being narrow enough to lie between such flanges when the clamp is closed.

3. In a clip for supporting wires or a conduit, a resilient metal strap formed into an open loop for embracing wires or a conduit and having one end extended beyond the other end and provided with an opening for reception of a fastening for securing the clip to a support, and a hook struck outwardly from the strap at a point spaced inwardly from the opening, and extending toward said other end with its bill turned inwardly toward the space within the loop, said other end having a hook-receiving opening therein and being movable to a position to have tensioned contact with the inner surface of the shank of the hook and to hook the bill of the hook in said hook-receiving opening.

GEORGE A. TINNERMAN.

REFERENCES CITED

The following references are of record in the file of this patent:

UNITED STATES PATENTS

| Number | Name | Date |
|---|---|---|
| 1,246,325 | Rohmer | Nov. 13, 1917 |
| 2,340,712 | Tinnerman | Feb. 1, 1944 |
| 2,340,713 | Tinnerman | Feb. 1, 1944 |
| 2,352,856 | Morehouse | July 4, 1944 |